US012573951B2

(12) United States Patent
Choi et al.

(10) Patent No.: US 12,573,951 B2
(45) Date of Patent: Mar. 10, 2026

(54) ELECTRONIC DEVICE COMPRISING BOOST CIRCUIT, AND METHOD FOR CONTROLLING SAME ELECTRONIC DEVICE

(71) Applicant: SAMSUNG ELECTRONICS CO., LTD., Suwon-si (KR)

(72) Inventors: Hangseok Choi, Suwon-si (KR); Sangwoo Kang, Suwon-si (KR); Chuleun Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/242,356

(22) Filed: Sep. 5, 2023

(65) Prior Publication Data

US 2023/0421060 A1 Dec. 28, 2023

Related U.S. Application Data

(63) Continuation of application No. PCT/KR2022/002911, filed on Mar. 2, 2022.

(30) Foreign Application Priority Data

Mar. 26, 2021 (KR) ........................ 10-2021-0039777

(51) Int. Cl.
H02M 3/158 (2006.01)
H02M 1/00 (2006.01)

(52) U.S. Cl.
CPC ......... H02M 3/158 (2013.01); H02M 1/0032 (2021.05)

(58) Field of Classification Search
CPC .... H02M 3/155; H02M 3/158; H02M 3/1582; H02M 1/0032

(Continued)

(56) References Cited

U.S. PATENT DOCUMENTS 6,275,016 B1 8/2001 Ivanov
7,750,609 B2 7/2010 Omi
(Continued)

FOREIGN PATENT DOCUMENTS

KR 10-2007-0117917 A 12/2007
KR 10-2011-0112163 A 10/2011
(Continued)

OTHER PUBLICATIONS

European Extended Search Report issued Jun. 28, 2024 by the European Patent Office for EP Patent Application No. 22775927.1.
(Continued)

*Primary Examiner* — Yemane Mehari
(74) *Attorney, Agent, or Firm* — Sughrue Mion, PLLC

(57) ABSTRACT

An electronic device includes: a display; a battery; and a boost circuit to receive power from the battery and to supply a driving voltage to the display. The boost circuit includes: a first switching device connected to a first node; a second switching device connected to the first node; an inductor between an input terminal of the boost circuit and the first node; an output capacitor to generate a DC overdrive voltage by smoothing an AC current generated by the first switching device and the second switching device; a blocking device to block a leakage current of the battery; and a control circuit to control the overdrive voltage by controlling the blocking device, based on a system voltage that is equal to or greater than a threshold voltage, and wherein the system voltage is an input voltage of the boost circuit.

20 Claims, 9 Drawing Sheets

(58) Field of Classification Search
USPC ......................................................... 323/271
See application file for complete search history.

(56) References Cited

U.S. PATENT DOCUMENTS

| | | | |
|---|---|---|---|
| 7,889,190 B2 * | 2/2011 | Woo ......................... | G09G 3/00 |
| | | | 345/212 |
| 7,948,720 B2 | 5/2011 | Mok et al. | |
| 8,643,637 B2 | 2/2014 | Lee et al. | |
| 9,419,431 B2 | 8/2016 | Prexl et al. | |
| 9,450,419 B2 | 9/2016 | Julicher et al. | |
| 9,628,906 B2 * | 4/2017 | Chowdary ............... | H04R 3/00 |
| 9,733,693 B2 | 8/2017 | Julicher et al. | |
| 9,859,796 B2 | 1/2018 | Yoon et al. | |
| 10,041,982 B2 | 8/2018 | Hu et al. | |
| 10,164,527 B2 | 12/2018 | Wang | |
| 10,333,416 B2 | 6/2019 | Kim et al. | |
| 10,879,789 B2 | 12/2020 | Kim et al. | |
| 11,467,189 B2 | 10/2022 | Hu et al. | |
| 2009/0237854 A1 | 9/2009 | Mok et al. | |
| 2009/0251118 A1 | 10/2009 | Omi | |
| 2011/0037756 A1 * | 2/2011 | Woo ....................... | H02M 3/158 |
| | | | 345/212 |
| 2012/0176361 A1 | 7/2012 | Lee et al. | |
| 2013/0249492 A1 * | 9/2013 | Kim ....................... | H01M 10/48 |
| | | | 320/128 |
| 2014/0049238 A1 | 2/2014 | Hu et al. | |
| 2014/0247624 A1 | 9/2014 | Anderson et al. | |
| 2015/0171747 A1 | 6/2015 | Wang | |
| 2015/0333502 A1 | 11/2015 | Prexl et al. | |
| 2015/0357916 A1 | 12/2015 | Yoon et al. | |
| 2017/0285711 A1 * | 10/2017 | Griffith ................. | G06F 1/3296 |
| 2019/0267908 A1 | 8/2019 | Kim et al. | |

FOREIGN PATENT DOCUMENTS

| | | |
|---|---|---|
| KR | 10-2011-0136537 A | 12/2011 |
| KR | 10-2014-0078743 A | 6/2014 |
| KR | 10-2015-0132071 A | 11/2015 |
| KR | 10-2015-0141428 A | 12/2015 |

OTHER PUBLICATIONS

International Search Report (PCT/ISA/210) issued Jun. 8, 2022 by the International Searching Authority in International Application No. PCT/KR2022/002911.

Written Opinion (PCT/ISA/237) issued Jun. 8, 2022 by the International Searching Authority in International Application No. PCT/KR2022/002911.

Office Action issued Feb. 20, 2025 by the Korean Patent Office for KR Patent Application No. 10-2021-0039777.

* cited by examiner

100

200

POWER
MANAGEMENT MODULE
188

CHARGING CIRCUIT
210

POWER REGULATOR
220

POWER GAUGE
230

BATTERY
189

PROTECTION
CIRCUIT MODULE
240

600

FIRST GATE VOLTAGE 610    VG1

SECOND GATE VOLTAGE 620    VG2

INDUCTOR OPPOSITE
TERMINAL VOLTAGE 630    VL

INDUCTOR CURRENT 640    IL

BOOST OUTPUT VOLTAGE 660    Vo

SYSTEM VOLTAGE 650    Vsys

ELECTRONIC DEVICE COMPRISING BOOST CIRCUIT, AND METHOD FOR CONTROLLING SAME ELECTRONIC DEVICE

CROSS-REFERENCE TO RELATED APPLICATIONS

This application is a by-pass continuation application of International Application No. PCT/KR2022/002911, filed on Mar. 2, 2022, which is based on and claims priority to Korean Patent Application No. 10-2021-0039777, filed on Mar. 26, 2021, in the Korean Intellectual Property Office, the disclosures of which are incorporated by reference herein their entireties.

BACKGROUND

1. Field

The disclosure relates to an electronic device including a boost circuit, and a method for controlling the same electronic device.

2. Description of Related Art

An electronic device may receive power from a battery to drive a display and may supply a driving voltage to the display. The driving voltage of the display may be higher than a voltage of the battery. The electronic device may generate a voltage higher than a voltage of the battery, which is input to deliver the driving voltage to the display, and output the voltage to the display. The electronic device may include a boost circuit to increase the input voltage of the battery to a higher voltage.

During the charging the battery, a voltage input from the battery to the boost circuit may be increased. When the increased input voltage of the boost circuit is approximately at the same level as the driving voltage, which is output from the boost converter, or higher than the level of the driving voltage, the boost circuit may not stably control the output voltage.

When the input voltage of the boost circuit is at a level higher than or similar to the level of the output voltage of the boost circuit, the operation of the boost converter may be periodically stopped. Accordingly, a phenomenon of 'skip cycle' (stopping the duration for driving the boost circuit) may be caused. In the boost circuit, when the phenomenon of skip cycle occurs, the magnitude of the driving voltage is irregularly changed, and thus, causes noise to the screen for displaying the display.

When the input voltage of the boost circuit is at a level similar to or higher than the level of an output voltage of the boost circuit, an additional boost circuit may be connected to the boost converter to maintain the output voltage to be constant. When the load circuit is connected to the boost converter, power loss may be caused in the load circuit connected to the boost converter.

SUMMARY

Provide are a method for stably controlling an output voltage while minimizing the additional power loss, even when the input voltage of the boost circuit is at a level higher than or similar to the level of the output voltage of the boost circuit, and an electronic device implementing the method.

According to one aspect of the disclosure, an electronic device includes: a display; a battery; and a boost circuit configured to receive power from the battery and to supply a driving voltage to the display, wherein the boost circuit includes: a first switching device connected to a first node; a second switching device connected to the first node; an inductor between an input terminal of the boost circuit and the first node; an output capacitor configured to generate a direct current (DC) overdrive voltage by smoothing an alternating current (AC) current generated by the first switching device and the second switching device; a blocking device configured to block a leakage current of the battery; and a control circuit configured to control the overdrive voltage by controlling the blocking device, based on a system voltage that is equal to or greater than a threshold voltage, and wherein the system voltage is an input voltage of the boost circuit.

According to another aspect of the disclosure, a method for controlling an electronic device, the method includes: receiving, by a boost circuit of the electronic device, power from a battery of the electronic device and supplying a driving voltage to a display of the electronic device; and controlling, by a control circuit of the boost circuit, an overdrive voltage of the electronic device, wherein the supplying of the driving voltage includes: generating, by a first switching device and a second switching device of the boost circuit, an alternating current (AC) current; and generating, by an output capacitor, a direct current (DC) overdrive voltage by smoothing the AC current, wherein controlling of the overdrive voltage includes controlling the overdrive voltage by controlling a blocking device to block a leakage current, based on a system voltage that is equal to or greater than a threshold voltage, and wherein the system voltage is an input voltage of the boost circuit.

According to one or more embodiments of the disclosure, even when the input voltage of the boost circuit is at the level higher than or similar to the level of the output voltage of the boost circuit, the operation of the boost circuit may be maintained. Accordingly, the noise of the screen displayed by the display may be reduced by reducing the skip cycle phenomenon of the boost circuit.

According to one or more embodiments of the disclosure, the boost circuit may be controlled using an amplification circuit to maintain the output voltage to be constant without connecting a load circuit to a boost converter. Accordingly, when compared to the connection with the load circuit, the additional power loss, which is caused to maintain the output voltage of the boost circuit to be constant, may be minimized.

Besides, a variety of effects directly or indirectly understood through the disclosure may be provided.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, the same or similar components will be marked by the same or similar reference signs.

DETAILED DESCRIPTION

Hereinafter, one or more embodiments of the disclosure will be described with reference to accompanying drawings. However, those of ordinary skill in the art will understand that the disclosure is not limited to a specific embodiment, and modifications, equivalents, and/or alternatives on the one or more embodiments described herein can be variously made without departing from the scope and spirit of the disclosure.

Figure 1:
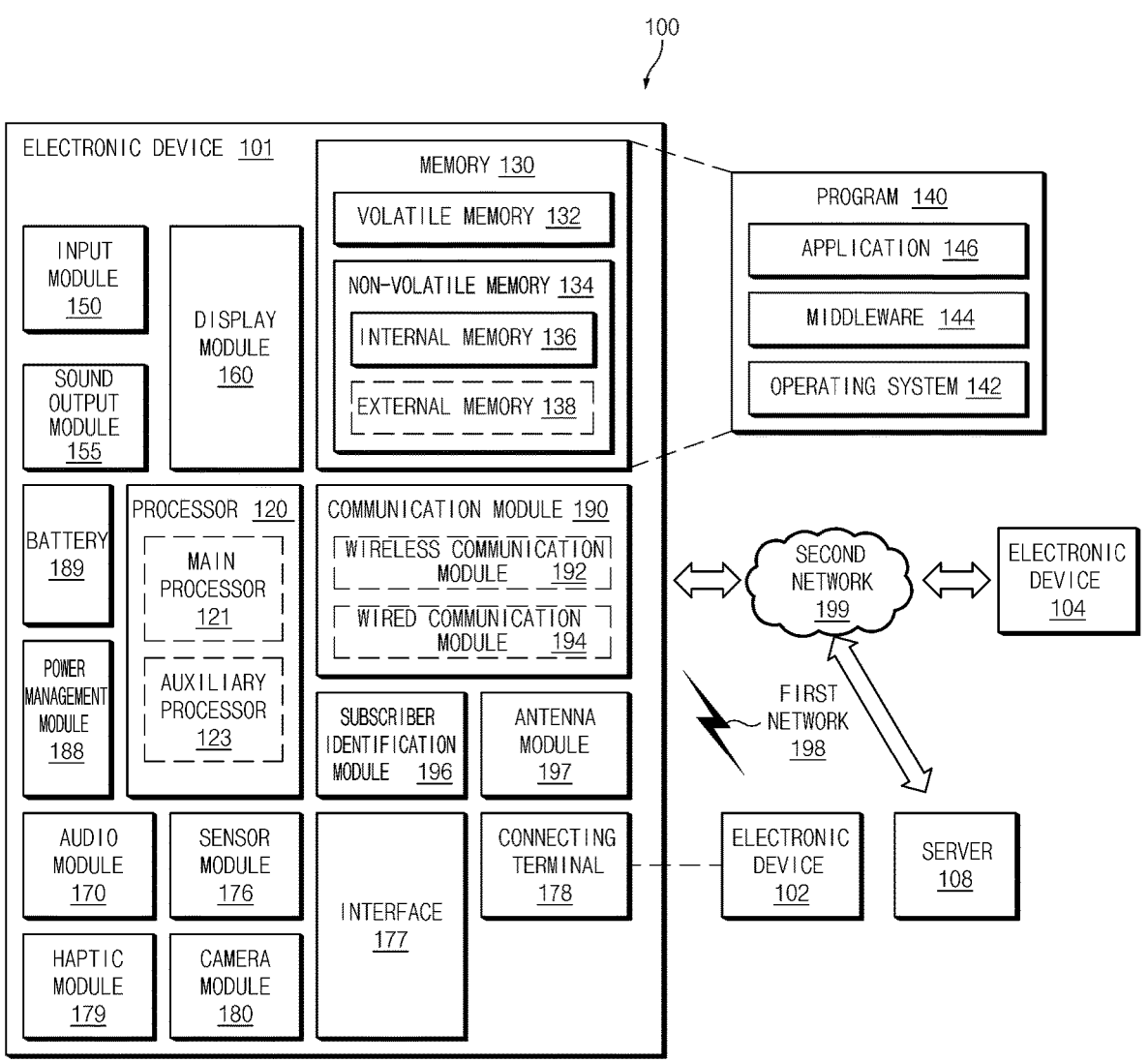
FIG. 1 illustrates an electronic device in a network environment, according to one or more embodiments.

FIG. 1 is a block diagram of an electronic device 101 in a network environment 100, according to one or more embodiments. Referring to FIG. 1, the electronic device 101 in the network environment 100 may communicate with an electronic device 102 over a first network 198 (e.g., a short range wireless communication network) or may communicate with an electronic device 104 or a server 108 over a second network 199 (e.g., a long distance wireless communication network). According to an embodiment, the electronic device 101 may communicate with the electronic device 104 through the server 108. According to an embodiment, the electronic device 101 may include a processor 120, a memory 130, an input module 150, a sound output module 155, a display 160, an audio module 170, a sensor module 176, an interface 177, a connecting terminal 178, a haptic module 179, a camera module 180, a power management module 188, a battery 189, a communication module 190, a subscriber identification module 196, or an antenna module 197. According to some embodiments, at least one (e.g., the connecting terminal 178) of the components may be omitted from the electronic device 101, or one or more other components may be added in the electronic device 101. According to some embodiments, some (e.g., the sensor module 176, the camera module 180, or the antenna module 197) of the components may be integrated into one component (e.g., the display 160).

The processor 120 may execute, for example, software (e.g., a program 140) to control at least one other component (e.g., a hardware or software component) of the electronic device 101 connected to the processor 120, and may perform various data processing or operations. According to an embodiment, as at least a part of the data processing or operations, the processor 120 may load a command or data received from any other component (e.g., the sensor module 176 or the communication module 190) to a volatile memory 132, may process the command or data stored in the volatile memory 132, and may store processed data in a nonvolatile memory 134. According to an embodiment, the processor 120 may include a main processor (e.g., a main processor 121 of FIG. 1; a central processing unit or an application processor) or an auxiliary processor (e.g., an auxiliary processor 123; a graphic processing nit or a neural processing unit, an image signal processor, a sensor hub processor, or a communication processor) operable independently from the main processor or together with the main processor. For example, when the electronic device 101 includes the main processor 121 and the auxiliary processor 123, the auxiliary processor 123 may be set to employ power lower than power of the main processor 121 or to be specified for a specific function. The auxiliary processor 123 may be implemented separately from the main processor 121 or as a portion of the main processor 121.

The auxiliary processor 123 may control at least a part of a function or states associated with at least one component (e.g., the display 160, the sensor module 176, or the communication module 190) of the electronic device 101, for example, instead of the main processor 121 while the main processor 121 is in an inactive (e.g., sleep) state and together with the main processor 121 while the main processor 121 is in an active (e.g., an application execution) state. According to an embodiment, the auxiliary processor 123 (e.g., an image signal processor or a communication processor) may be implemented as a part of any other component (e.g., the camera module 180 or the communication module 190) which is functionally (or operatively) associated with the auxiliary processor 123. According to an embodiment, the auxiliary processor 123 (e.g., a neural network processing device) may include a hardware structure specified for processing an artificial intelligence (AI) model. The AI model may be generated through machine learning. The learning may be performed by the electronic device 101 performing the AI, and may be performed through an additional server (e.g., the server 108). A learning algorithm may include, for example, a supervised learning algorithm, a unsupervised learning algorithm, a semi-supervised learning algorithm, or a reinforcement learning algorithm, but the disclosure is not limited thereto. The AI model may include a plurality of artificial neural network (ANN) layers. The ANN may include a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks or the combination of the above networks, but the disclosure is not limited thereto. The AI model may additionally or alternatively include a software structure, in addition to a hardware structure.

The memory 130 may store various data which are used by at least one component (e.g., the processor 120 or the sensor module 176) of the electronic device 101. The data may include, for example, software (e.g., the program 140), or input data or output data associated with a command of the software. The memory 130 may include the volatile memory 132 or the nonvolatile memory 134.

The program 140 may be stored in the memory 130 as software, and may include, for example, an operating system 142, a middleware 144, or an application 146.

The input module 150 may receive a command or data which will be used by a component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for a general purpose, such as multimedia play or recording play. The receiver may be used to receive an incoming call. According to an embodiment, the receiver may be implemented separately from a speaker or as a portion of the speaker.

The display 160 may visibly provide information to the outside (e.g., a user) of the electronic device 101. The display 160 may include, for example, a display, a hologram device, or a control circuit for controlling a projector and a corresponding device. According to an embodiment, the display 160 may include a touch sensor configured to sense a touch, or a pressure sensor configured to measure the strength of force generated by the touch.

The audio module 170 may convert sound to an electrical signal, or reversely, may convert an electrical signal to sound. According to an embodiment, the audio module 170 may obtain sound through the input module 150, or may output sound through the sound output module 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector that may allow the electronic device 101 to be physically connected with an external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric sensor, or an electrical stimulation device.

The camera module 180 may shoot a still image or a video image. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, in the form of at least a part of a power management integrated circuit (PMIC).

The battery 189 may power at least one component of the electronic device 101. According to an embodiment, the battery 189 may include, for example, a primary cell not recharged, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) or may perform communication through the established communication channel. The communication module 190 may include one or more communication processors which is operated independently of the processor 120 (e.g., an application processor) and supports direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with the external electronic device 104 over the first network 198 (e.g., a short range communication network such as Bluetooth, a wireless fidelity (Wi-Fi) direct, or infrared data association (IrDA)) or the second network 199 (e.g., a legacy cellular network, a 5G network, a next-generation network, the Internet, or a computer network (e.g., a local area network (LAN) or a wide area network (WAN))). The above-described kinds of communication modules may be integrated in one component (e.g., a single chip) or may be implemented with a plurality of components (e.g., a plurality of chips) which are independent of each other. The wireless communication module 192 may verify and authenticate the electronic device 101 within a communication network, such as the first network 198 or the second network 199, by using subscriber information (e.g., international mobile subscriber identity (IMSI)) stored in the subscriber identification module 196.

The wireless communication module 192 may support a 5G network after a 4G network and a next-generation communication technology (e.g., a NR (new radio) access technology). The NR access technology may support high-speed transmission (enhanced mobile broadband (eMBB)), massive machine type communications (mMTC) for minimizing terminal power and accessing to multiple terminals, and ultra-reliable and low-legacy communications. The wireless communication module 192 may support a high-frequency band (e.g., mmWave band) to achieve the higher data transfer rate. The wireless communication module 192 may support various technologies, for example, beamforming, massive multiple-input and multiple-output (MIMO), full dimensional MIMO (FD-MIMO), an array antenna, an analog beam-forming, or a large scale antenna, for ensuring performance in a higher-frequency band. The wireless communication module 192 may support various requirements specified for an external electronic device (e.g., the electronic device 104) or the network system (e.g., the second network 199). According to an embodiment, the wireless communication module 192 may support a peak data rate (e.g. 20 Gbps or more) for realizing eMBB, a coverage (e.g., 164 dB or less) for realizing mMTC, or U-plane latency (e.g., 0.5 ms for each of a downlink (DL) or an uplink (UL), or 1 ms or less for a round trip)

The antenna module 197 may transmit a signal or a power to the outside (e.g., an external electronic device) or may receive a signal or a power from the outside. According to an embodiment, the antenna module 197 may include an antenna including a conductor formed on a substrate (e.g., a PCB) or a radiator having a conductive pattern. According to an embodiment, the antenna module 197 may include a plurality of antennas (e.g., an array antenna). In this case, at least one antenna which is suitable for a communication scheme used in a computer network such as the first network 198 or the second network 199 may be selected, for example, by the communication module 190 from the one or more antennas. The signal or power may be exchanged between the communication module 190 and an external electronic device through the selected at least one antenna or may be received from the external electronic device through the selected at least one antenna and the communication module 190. According to an embodiment, another component (e.g., a radio frequency integrated circuit (RFIC)) may be additionally formed as a portion of the antenna module 197, in addition to the radiator.

According to one or more embodiments, the antenna module 197 may include an mmWave antenna module. According to an embodiment, the mmWave antenna module may include a printed circuit board, an RFIC disposed on a first surface (e.g., a bottom surface) of the printed circuit board or disposed adjacent to the first surface to support a specific high frequency band (e.g. mmWave band), and a plurality of antennas (e.g., an array antenna) disposed on a second surface (e.g., a top surface or a side surface) of the printed circuit board or disposed adjacent to the second surface to transmit or receive a signal having the specified high-frequency band.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the external electronic devices 102 and 104 may be the same or different types as or from the electronic device 101. According to an embodiment, all or a part of operations to be executed in the electronic device 101 may be executed in one or more external devices of the external electronic devices 102, 104, or 108. For example, in the case where the electronic device 101 should perform any function or service automatically or in response to a request from the user or any other device, the electronic device 101 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 101. The electronic device 101 may process received result as it is or additionally, and may provide a result of the processing as at least a part of the response to the request. To this end, for example, cloud computing, distributed computing, or client-server computing may be used. The electronic device 101 may provide an extremely low latency service by using distributed computing or mobile-etching computing. According to another embodiment, the external electronic device 104 may include an Internet of things (IoT) device. The server 108 may be an intelligent server through machine learning and/or a neural network. According to an embodiment, the external electronic device 104 or the server 108 may be included in the second network 199. The electronic device 101 may be applied to the intelligent services (e.g., smart homes, smart cities, smart cars, or healthcare) based on 5G communication technology and IoT-related technologies.

Figure 2:
FIG. 2 illustrates a power management module and a battery, according to one or more embodiments.
Figure 2:
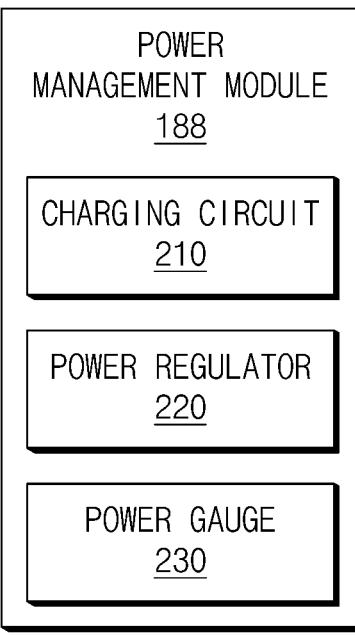
Figure 2:
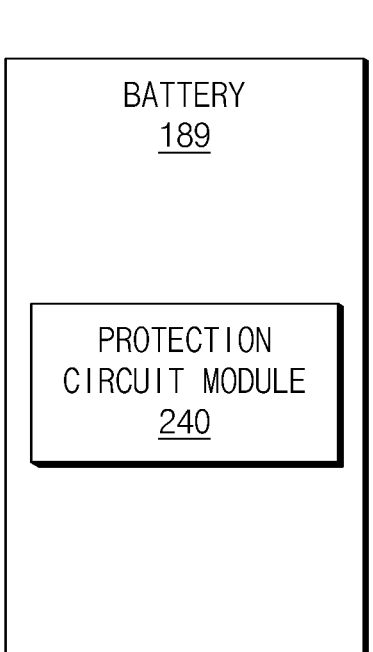

FIG. 2 is a block diagram 200 for the power management module 188 and the battery 189, according to one or more embodiments. Referring to FIG. 2, the power management module 188 may include a charging circuit 210, a power regulator 220, or a power gauge 230. The charging circuit 210 may charge the battery 189 by using a power supplied from an external power source for the electronic device 101. According to an embodiment, the charging circuit 210 may select a charging manner (e.g., normal charging or quick charging) based on at least a part of a kind (e.g., power adapter, USB or wireless charging) of an external power source, a magnitude (e.g., approximately 20 Watt or more) of a power capable of being supplied from the external power source, or attributes of the battery 189, and may charge the battery 189 by using the selected charging manner. For example, the external power source may be wiredly connected to the electronic device 101 through the connecting terminal 178 or may be wirelessly connected to the electronic device 101 through the antenna module 197.

The power regulator 220 may generate a plurality of powers having different voltage or current levels by regulating a voltage level or a current level of the power supplied from the battery 189. The power regulator 220 may regulate the external power or the power of the battery 189 to a voltage or current level suitable for some of component included in the electronic device 101. According to an embodiment, the power regulator 220 may be implemented in the form of a low drop out (LDO) or the form of a switching regulator. The power gauge 230 may measure information (e.g., a capacity, a charging/discharging count, a voltage, or a temperature of the battery 189) about a use state of the battery 189.

For example, the power management module 188 may decide charging state information (e.g., a lifetime, an overvoltage, a low voltage, an over-current, overcharging, an over discharge, over-heating, a short circuit, or swelling) associated with charging the battery 189 based on at least a portion of the use state information, by using the charging circuit 210, the power regulator 220, or the power gauge 230. The power management module 188 may determine whether the battery 189 is abnormal or normal, based on at least a portion of the decided charging state information. When it is determined that the battery 189 is in an abnormal state, the power management module 188 may control the charging of the battery 189 (e.g., may decrease a charging current or voltage or may stop the charging). According to an embodiment, at least a part of functions of the power management module 188 may be performed by an external control device (e.g., the processor 120).

According to an embodiment, the battery 189 may include a protection circuit module 240. The protection circuit module 240 may perform one or more of various functions (e.g., a pre-cutoff function) for the purpose of preventing the reduction of performance of the battery 189 or the damage of the battery 189. The protection circuit module 240 may be implemented, additionally or alternatively, as at least a part of a battery management system (BMS) capable of performing various functions including cell balancing, battery capacity measurement, charging/discharging count measurement, temperature measurement, or voltage measurement.

According to an embodiment, at least a portion of the use state information or the charging state information of the battery 189 may be measured by using a relevant sensor (e.g., a temperature sensor) in the sensor module 176, the power gauge 230, or the power management module 188. According to an embodiment, the relevant sensor (e.g., a temperature sensor) in the sensor module 176 may be included as a part of the protection circuit module 240 or may be positioned in the vicinity of the battery 189 as a device independent of the protection circuit module 240.

Figure 3:
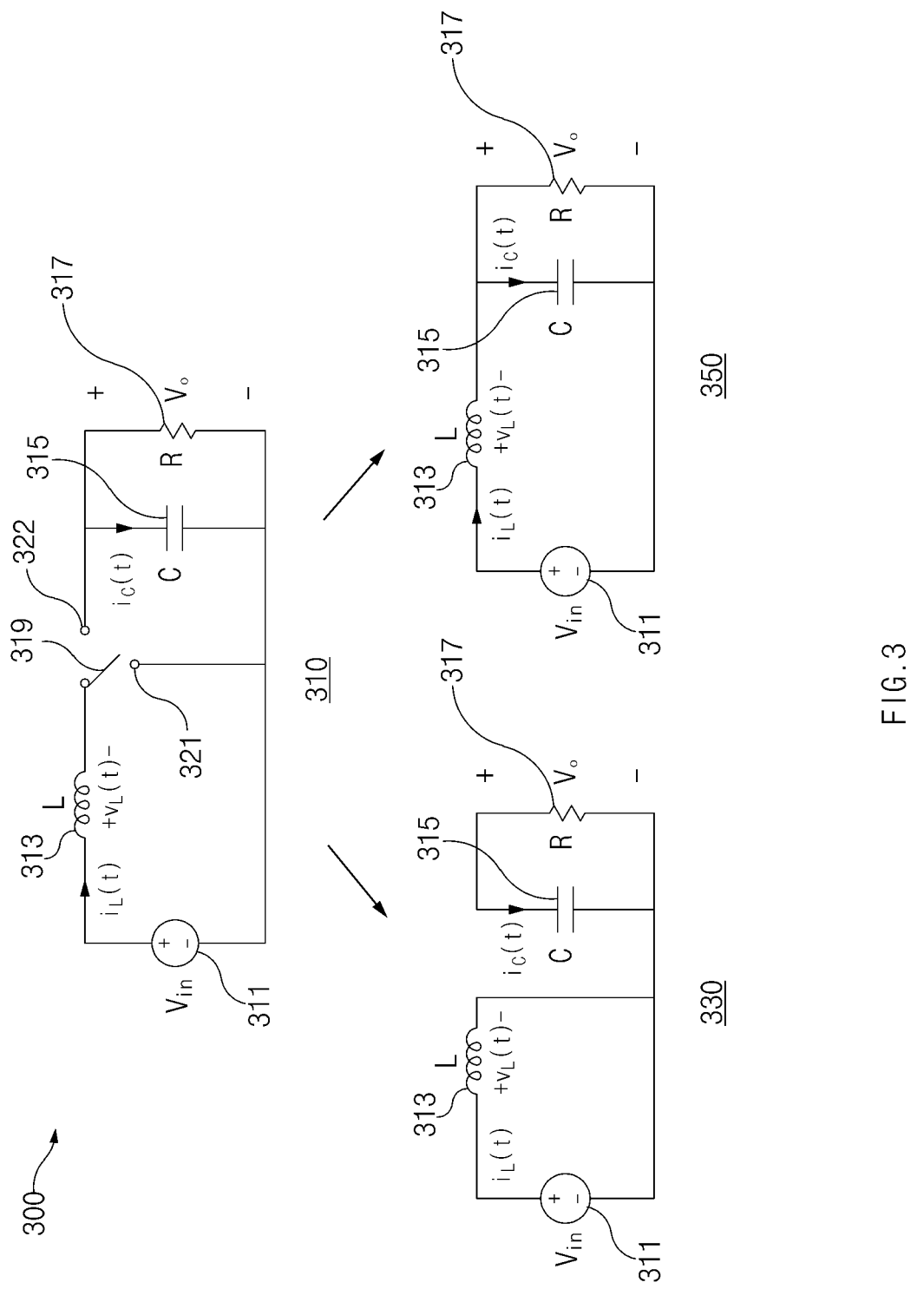
FIG. 3 illustrates a boost circuit, according to an embodiment.

FIG. 3 is a view 300 illustrating a boost circuit 310, according to an embodiment.

According to an embodiment, the boost circuit 310 may be a DC-DC converter. The boost circuit 310 may increase the magnitude of an input voltage applied to an input unit. The boost circuit 310 may step up the input voltage and output the stepped-up voltage to a load 317. The load 317 may be modeled in the form of a resistor. A boost output voltage Vo may be applied to opposite terminals of the load 317. According to an embodiment, the boost circuit 310 may include a power supply unit 311, an inductor 313, a capacitor 315, and a switch 319.

According to an embodiment, the power supply unit 311 may supply a power-supply-input voltage Vin. The power supply unit 311 may supply a DC voltage.

According to an embodiment, the inductor 313 may be connected to the power supply unit 311. An inductor voltage $V_L(t)$ may be applied to opposite terminals of the inductor 313. An inductor current $i_L(t)$ may flow through the inductor 313. The inductor voltage $V_L(t)$ and the inductor current $i_L(t)$ may be varied over time.

According to an embodiment, the capacitor 315 may be connected in parallel to the load 317. One side of the capacitor 315 may be selectively connected to the switch 319. A capacitor current $i_c(t)$ may flow through the capacitor 315. The capacitor current $i_c(t)$ may be varied over time.

According to an embodiment, the inductor 313 may be connected to one side of the switch 319. An opposite side of the switch 319 may be selectively connected to a first terminal 321 or a second terminal 322. The switch 319 may be connected to the first terminal 321 for a specific duration, and may be connected to the second terminal 322 for a remaining duration except for the specific duration. For example, the switch 319 may be implemented by using at least one diode. For another example, the switch 319 may be implemented by using at least one metal-oxide-semiconductor field-effect transistor (MOSFET).

According to an embodiment, the switch 319 may be connected to the first terminal 321 for a first duration of one duty cycle, and may be connected to the second terminal 322 for a second duration of the one duty cycle. The duty cycle may be one cycle in which the boost circuit 310 is in an activated state 330 and a non-activated state 350. When the switch 319 is connected to the first terminal 321, the state of the boost circuit 310 may be changed to the activated state 330. When the switch 319 is connected to the second terminal 322, the state of the boost circuit 310 may be changed to the non-activated state 350.

According to an embodiment, the inductor voltage $V_L(t)$ may be equal to the power-supply-input voltage Vin in the activated state 330. The variation of the inductor current $i_L(t)$ may be proportional to the inductor voltage $V_L(t)$ due to the characteristic of the inductor 313. The variation of the inductor current $i_L(t)$ may be proportional to the power-supply-input voltage Vin in the activated state 330.

According to an embodiment, in the non-activated state 350, the inductor voltage $V_L(t)$ may be a voltage value (Vin-Vo) obtained by subtracting the boost output voltage Vo from the power-supply-input voltage Vin. In the non-activated state 350, the variation of the inductor current $i_L(t)$ may be proportional to the voltage value (Vin-Vo) obtained by subtracting the boost output voltage Vo from the power-supply-input voltage Vin.

Figure 4:
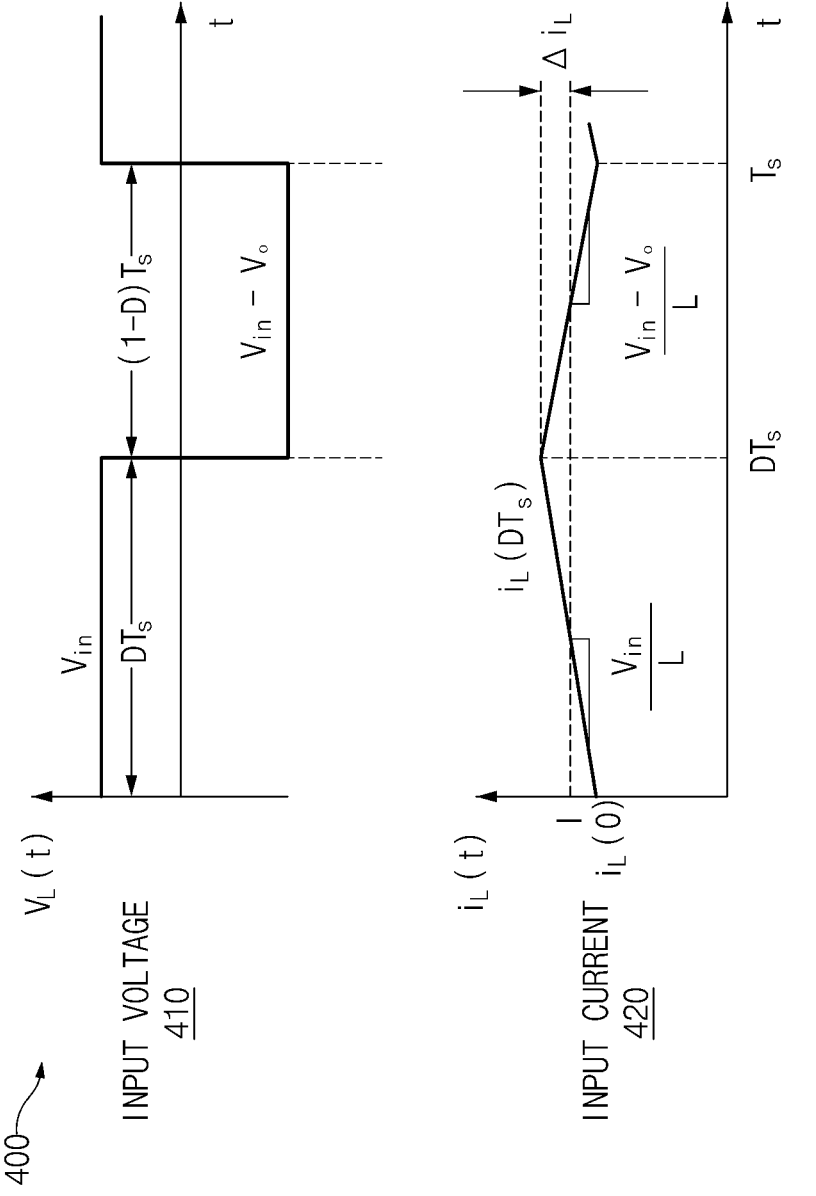
FIG. 4 illustrates an input voltage and an input current of a boost circuit, according to an embodiment.

FIG. 4 is a waveform diagram 400 illustrating an input voltage 410 and an input current 420 of a boost circuit (e.g., the boost circuit 310 of FIG. 3), according to an embodiment.

According to an embodiment, the input voltage 410 of the boost circuit 310 may be defined as the inductor voltage $V_L(t)$ applied to an inductor (e.g., the inductor 313 of FIG. 3). The input voltage 410 may be the power-supply-input voltage Vin for a first duration DTs set based on a duty ratio (D) of a duty cycle Ts. The input voltage 410 may be the voltage value (Vin-Vo) obtained by subtracting the boost output voltage Vo from the power-supply-input voltage Vin for a second duration (1-D)Ts which is the remaining duration except for the first duration DTs.

According to an embodiment, the input current 420 of the boost circuit 310 may be defined as the inductor current $i_L(t)$ flowing through the inductor 313. The input current 420 may be increased for the first duration DTs. The increasing speed of the input current 420 may be a value (Vin/L) obtained by dividing the power-supply-input voltage Vin by the inductance (L) of the inductor 313. The input current 420 may be decreased for the second duration (1-D)Ts. The decreasing speed of the input current 420 may be a value (Vin-Vo)/L, which is obtained by dividing the voltage value (Vin-Vo) obtained by subtracting the boost output voltage Vo from the power-supply-input voltage Vin by the inductance L of the inductor 313.

According to an embodiment, the boost circuit 310 may control the boost output voltage Vo to be greater than an input voltage $V_i$ by changing the input voltage 410 and the input current 420 for the duty cycle Ts. The boost output voltage Vo of the boost circuit 310 may be greater than the input voltage $V_i$ by "1/1-D". Accordingly, the magnitude of the boost output voltage Vo may be controlled by controlling the duty ratio (D) of the boost circuit 310.

Figure 5:
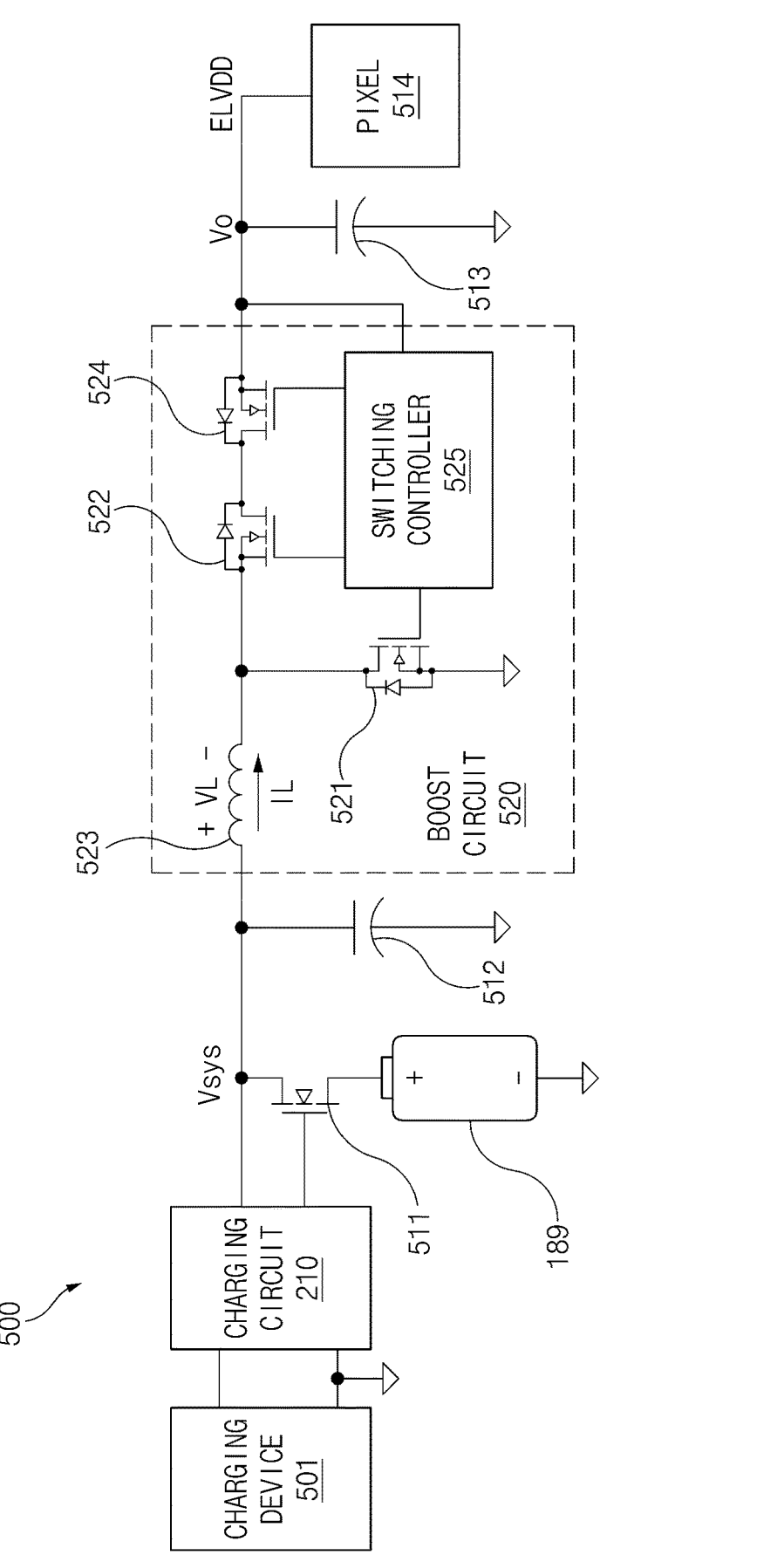
FIG. 5 illustrates an electronic device including a boost circuit, according to a comparative example.

FIG. 5 is a view 500 illustrating an electronic device (e.g., the electronic device 101) including a boost circuit 520, according to a comparative example.

According to a comparative example, the electronic device 101 may include the battery 189 and the charging circuit 210. The battery 189 may store power necessary for driving the electronic device 101. The battery 189 may output a system voltage Vsys necessary for driving the electronic device 101. The charging circuit 210 may charge the battery 189 with power, in response to that the electronic device 101 is connected to a charging device 501.

According to a comparative example, the electronic device 101 may include a battery switch 511, a battery capacitor 512, an output voltage capacitor 513, and a pixel 514. The battery switch 511 may control a current flowing into the battery 189 and a current flowing out of the battery 189. The battery capacitor 512 may stably control the system voltage Vsys. The output voltage capacitor 513 may stably control the boost output voltage Vo. The pixel 514 may be driven using the boost output voltage Vo as a pixel driving voltage ELVDD.

According to a comparative example, the electronic device 101 may include the boost circuit 520. The boost circuit 520 may be a DC-DC converter. The boost circuit 520 may control the boost output voltage Vo to be greater in magnitude than the system voltage Vsys which is an input voltage of the boost circuit 520. For example, the boost circuit 520 may supply the driving voltage ELVDD of about 4.6 V to the pixel 514 by stepping up the system voltage Vsys of about 4.4 V to the boost output voltage Vo of about 4.6 V. The boost circuit 520 may include a first switching device 521, a second switching device 522, an inductor 523 (e.g., the inductor 313 of FIG. 3), a blocking device 524, and a switching controller 525.

According to a comparative example, the first switching device 521 and the second switching device 522 may control a voltage VL at opposite terminals (inductor opposite terminals) of the inductor. The inductor 523 may control the magnitude ratio between the voltage VL at the inductor opposite terminals and the boost output voltage Vo. The blocking device 524 may block a current from flowing back due to the driving voltage ELVDD. The blocking device 524 may be a reverse blocking field effect transistor (FET). The switching controller 525 may control the first switching device 521 and the second switching device 522. The first switching device 521 may be interposed between the inductor 523 and the blocking device 524. The second switching device 522 may be interposed between the inductor 523 and the switching controller 525.

According to a comparative example, a voltage drop may occur at an impedance of a charging path during charging the battery 189. The system voltage Vsys, which is an input voltage of the boost circuit 520, may be increased. For example, the system voltage Vsys may be increased to about 4.8 V during the charging of the battery 189.

According to a comparative example, the boost circuit 520 may normally operate while reducing the current of the inductor 523 when the reverse voltage is applied during the second duration (1-D)Ts. The voltage applied for the second duration (1-D)Ts may be a voltage obtained by subtracting the boost output voltage Vo from the system voltage Vsys. When the system voltage Vsys, which is the input voltage of the boost circuit 520, is increased to be greater than the boost output voltage Vo, the current flowing through the inductor 523 may be gradually increased for the second duration (e.g., the second duration (1-D)Ts of FIG. 4) in which the first switching device 521 is turned off. Accordingly, the boost output voltage Vo of the boost circuit 520 may be gradually increased. In this case, as the skip cycle phenomenon in which the operation of the boost circuit 520 is temporally stopped and resumed, occurs, noise may be caused on the screen displayed by the pixel 514.

According to a comparative example, the reverse voltage may be applied to the second switching device 522, as the second switching device 522 operates as a body diode without receiving a driving gate signal. However, the magnitude of the reverse voltage resulting from the body diode may have a constant value depending on the characteristic of the second switching device 522. For example, when the second switching device 522 operates as the body diode, the voltage drop of about 0.7 V may occur. During the charging of the battery 189, when the system voltage Vsys is variably changed, the boost circuit 520 may not be easily controlled due to the reverse voltage resulting from the body diode.

According to a comparative example, as the load circuit is added in parallel to the output stage of the boost circuit 520, the current flowing through the inductor 523 and the boost output voltage Vo may be constantly controlled for the second duration (1-D)Ts. However, the load circuit is added in parallel to the output stage, the power loss may be caused in the load circuit. The power loss by a value obtained by multiplying the boost output voltage Vo by the current flowing through the load circuit, may be caused.

Figure 6:
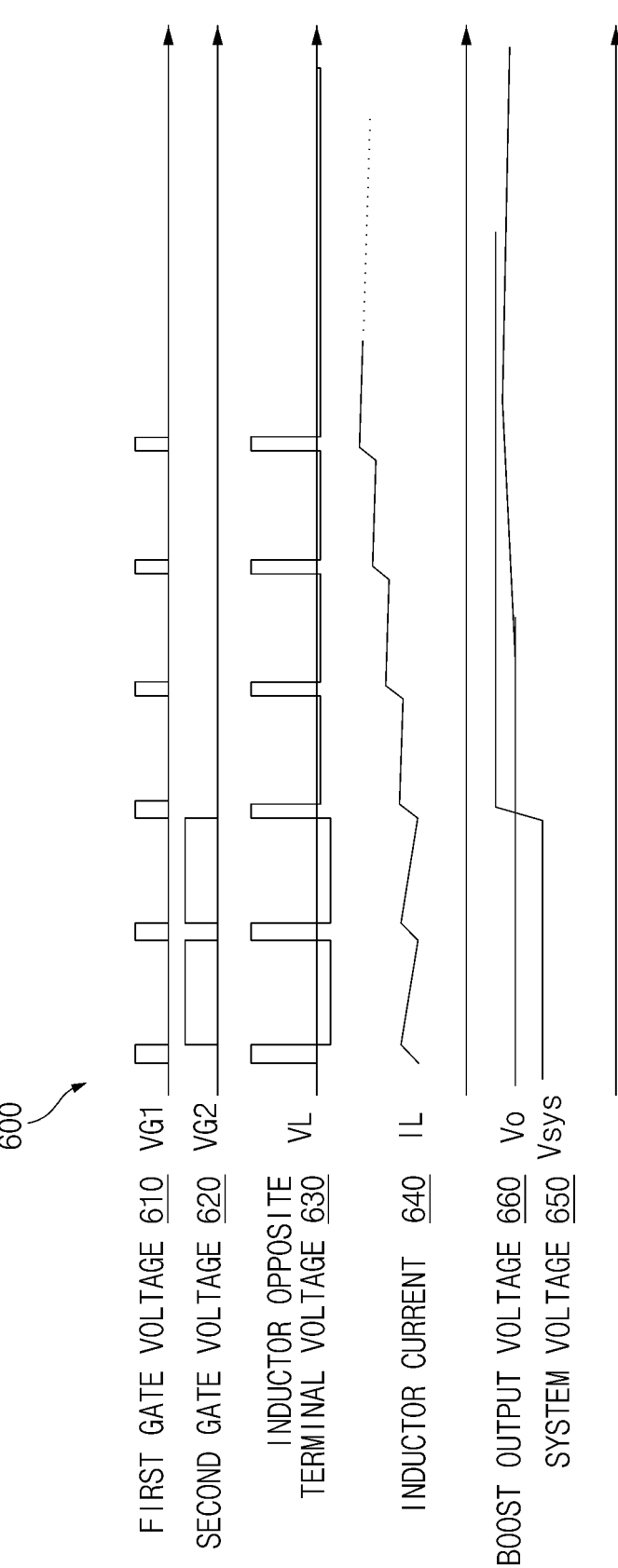
FIG. 6 illustrates a voltage and a current of an electronic device including a boost circuit, according to a comparative example.

FIG. 6 is a waveform 600 illustrating a voltage and a current of an electronic device (e.g., the electronic device 101 of FIG. 1) including a boost circuit (e.g., the boost circuit 520 of FIG. 5) according to a comparative example.

According to a comparative example, the first switching device (e.g., the first switching device 521 of FIG. 5) may be turned on or off by a first gate voltage 610. For a first duration (e.g., the first duration DTs of FIG. 4) in which the first gate voltage 610 is in a high state 'H', the first switching device 521 is turned on to control an inductor opposite terminal voltage VL 630 to a system voltage Vsys 650 and may increase a inductor current IL 640. For the second duration (e.g., the second duration (1-D)Ts of FIG. 4) in which the first gate voltage 610 is in a low state 'L', the first switching device 521 is turned off to control the inductor opposite terminal voltage VL 630 to a value Vsys-Vo, which is obtained by subtracting a boost output voltage Vo 660 from the system voltage Vsys 650 and may increase the inductor current IL 640.

According to a comparative example, the second switching device (e.g., the second switching device 522 of FIG. 5) may be turned on or off by a second gate voltage 620. For the second duration (e.g., the second duration (1-D)Ts of FIG. 4) in which the second gate voltage 620 is in a high state 'H', the second switching device 522 is turned on to control the inductor opposite terminal voltage VL 630 to the value (Vsys-Vo), which is obtained by subtracting the boost output voltage Vo 660 from the system voltage Vsys 650 and may decrease the inductor current IL 640.

According to a comparative example, when the system voltage Vsys 650 is increased, the inductor opposite terminal voltage VL 630 may have a value approaching '0' for the second duration (1-D)Ts. When the system voltage Vsys 650 is increased, the second switching device 522 may be maintained to be turned off. When the system voltage Vsys 650 is increased, the inductor current IL 640 may be gradually increased. When the system voltage Vsys 650 is increased, the boost output voltage Vo may be gradually increased.

Figure 7:
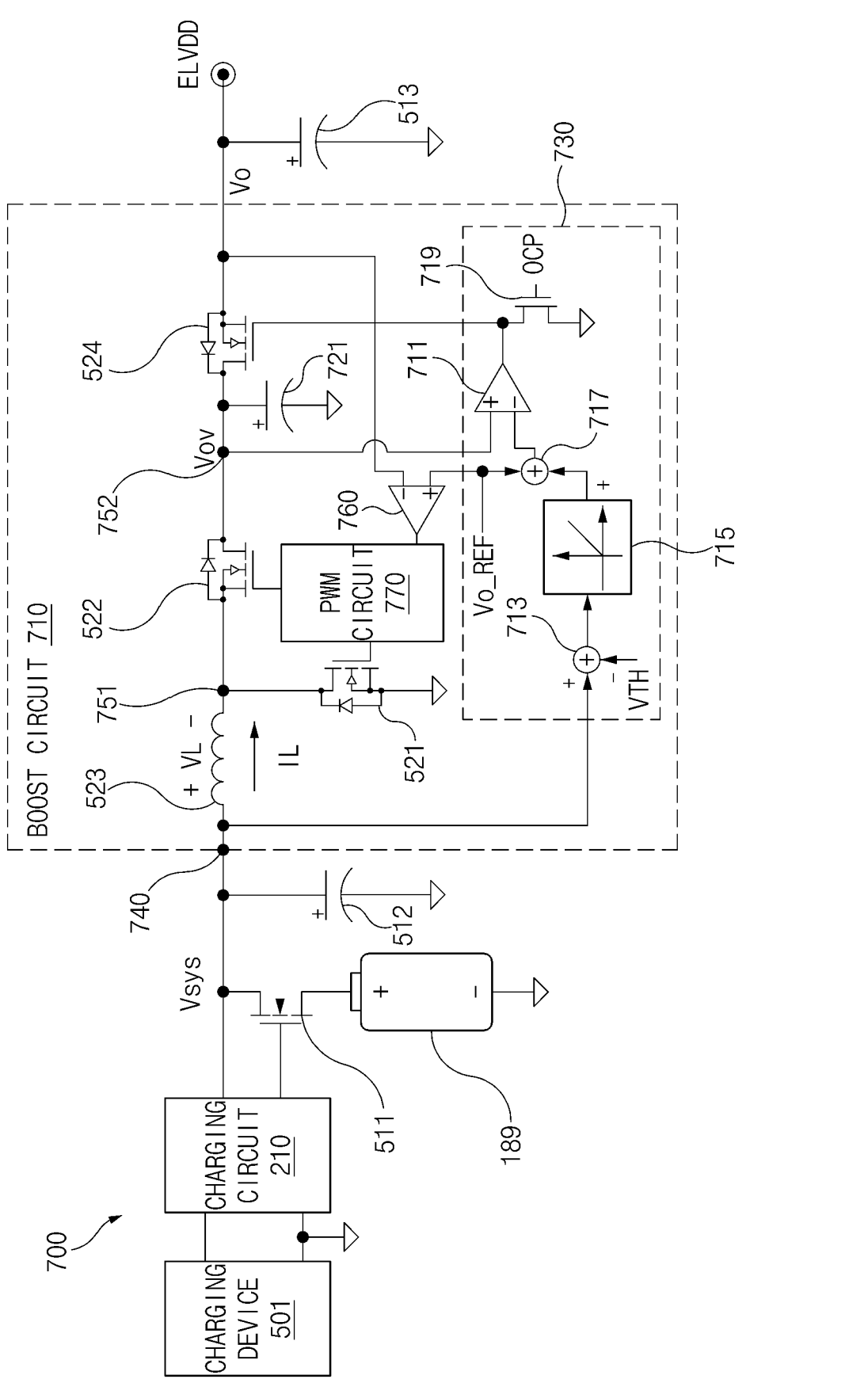
FIG. 7 illustrates an electronic device including a boost circuit, according to an embodiment.

FIG. 7 is a view 700 illustrating an electronic device (e.g., the electronic device 101 of FIG. 1) including a boost circuit 710, according to an embodiment.

According to an embodiment, the electronic device 101 may include the battery 189, the charging circuit 210, the battery switch 511, the battery capacitor 512, and the output voltage capacitor 513. According to an embodiment, the battery 189, the charging circuit 210, the battery switch 511, the battery capacitor 512, and the output voltage capacitor 513 of the electronic device 101 may be substantially the same as the battery 189, the charging circuit 210, the battery switch 511, the battery capacitor 512, and the output voltage capacitor 513 of the electronic device 101 according to the comparative example of FIG. 5.

According to an embodiment, the electronic device 101 may include the boost circuit 710. The boost circuit 710 may be a DC-DC converter. The boost output voltage Vo, which is an output voltage of the boost circuit 710, is applied to the output voltage capacitor 513. The boost circuit 710 may include the first switching device 521, the second switching device 522, a control circuit 730, a voltage comparison circuit 760, and a power width modulation (PWM) circuit 770. According to one embodiment, the first switching device 521 and the second switching device 522 of the electronic device 101 may be substantially the same as the first switching device 521 and the second switching device 522 of the electronic device 101 according to the comparative example of FIG. 5.

According to an embodiment, the boost circuit 710 may include the inductor 523 (e.g., the inductor 313 of FIG. 3). The inductor 523 may be interposed between an input node 740 and a first node 751 of the boost circuit 710. The inductor opposite terminal voltage VL may be a value obtained by subtracting a voltage at the first node 751 from a voltage at the input node 740. The inductor 523 may control the magnitude ratio between the inductor opposite terminal voltage VL and the boost output voltage Vo based on the driving time ratio (e.g., the duty ratio 'D' of FIG. 4).

According to an embodiment, the boost circuit 710 may include the blocking device 524. The blocking device 524 may block a current from flowing back due to the driving voltage ELVDD. The blocking device 524 may be fully turned on when the display (e.g., the display 160 of FIG. 1) operates. The blocking device 524 may supply the boost output voltage Vo to the display 160, when the display 160 operates.

According to an embodiment, the blocking device 524 may be turned off to prevent a leakage current from the battery 189 from being supplied to the display 160, when the power is not supplied to the display 160. When the blocking device 524 is not disposed, and when the power is not supplied to the display 160, the diode-connection is made between the battery 189 and the display 160, such that the leakage current flows to the display 160.

According to an embodiment, the boost circuit 710 may include an output capacitor 721. The output capacitor 721 may smooth an AC current generated by the first switching device 521 and the second switching device 522. The output capacitor 721 may have a greater capacitance in magnitude when compared to the AC current, to smooth the AC current.

According to an embodiment, the output capacitor 721 may generate a DC overdrive voltage Vov. The overdrive voltage Vov may be formed at a second node 752. The second node 752 may be a node interposed between the blocking device 524 and the second switching device 522.

According to an embodiment, the boost circuit 710 may include the control circuit 730 to control the overdrive voltage Vov. The control circuit 730 may vary the impedance of the blocking device 524 in response to that the system voltage Vsys is greater than a threshold voltage VTH. The control circuit 730 may increase the overdrive voltage Vov to correspond to that the system voltage Vsys is increased. The control circuit 730 may control the overdrive voltage Vov such that the inductor opposite terminal voltage VL is maintained to the reverse voltage for the second duration (e.g., the second duration (1-D)Ts of FIG. 8).

According to an embodiment, the control circuit 730 may increase the impedance of the blocking device 524 in response to that the system voltage Vsys is equal to or greater than the threshold voltage VTH. When the impedance of the blocking device 524 is increased, the overdrive voltage Vov may be increased. The control circuit 730 may control the gate terminal of the blocking device 524 such that the impedance of the blocking device 524 is an intermediate impedance between an impedance in a fully turn-on state and an impedance in a fully turn-off state.

According to an embodiment, the control circuit 730 may control the inductor opposite terminal voltage VL to be the reverse voltage for the second duration (1-D)Ts. According to an embodiment, the control circuit may include an amplification circuit 711, voltage comparison units (the first voltage adder 713, the limiting amplifier 715, and the second voltage adder 717), and a switching device 719.

According to an embodiment, the amplification circuit 711 may be connected with the blocking device 524. The amplification circuit 711 may be set to control the blocking device 524 when the system voltage Vsys, which is the voltage of the output terminal of the battery 189, is equal to or greater than the threshold voltage VTH. When the system voltage Vsys is equal to or greater than the threshold voltage VTH, the amplification circuit 711 may control the blocking device 524 to allow the blocking device 524 to generate the overdrive voltage Vov.

According to one embodiment, the threshold voltage VTH may be set to have a value substantially equal to the driving voltage ELVDD. The overdrive voltage Vov may be a value greater than the boost output voltage Vo. For the second duration (1-D)Ts, the inductor opposite terminal voltage VL may be a value (Vsys-Vov) obtained by subtracting the overdrive voltage Vov from the system voltage Vsys. The amplification circuit 711 may control the blocking device 524 such that the overdrive voltage Vov is greater than the system voltage Vsys, when the system voltage Vsys is equal to or greater than the threshold voltage VTH, thereby ensuring the reverse voltage at opposite terminals of the inductor 523 for the second duration (1-D)Ts.

According to an embodiment, the amplification circuit 711 may include a first input terminal (a '+' input terminal) and an output terminal. The first input terminal (the '+' input terminal) may be connected to the second node 752. The first input terminal (the '+' input terminal) may measure the overdrive voltage Vov. The output terminal may be connected to the gate terminal of the blocking device 524. The output terminal may adjust the impedance of the blocking device 524 by turning on or off the blocking device 524.

According to an embodiment, the amplification circuit 711 may further include a second input terminal (a – input terminal) and an output terminal. The second input terminal (the '–' input terminal) may be connected to the voltage comparison units (the first voltage adder 713, the limiting amplifier 715, and the second voltage adder 717).

According to an embodiment, the amplification circuit 711 may output an output voltage to the output terminal to control the operation of turning on or turning off the blocking device 524, based on the values associated with the overdrive voltage Vov input to the first input terminal (the '+' input terminal) and the system voltage Vsys input to the second input terminal (the '–' input terminal). For example, the amplification circuit 711 may be an operational amplifier (OP-Amp) or a differential amplifier. The amplification circuit 711 may output the output voltage to the output terminal, based on the difference between the values associated with the overdrive voltage Vov and the system voltage Vsys. The amplification circuit 711 may control the size of the output voltage output to the output terminal, to be proportional to the difference between the values associated with the overdrive voltage Vov and the system voltage Vsys.

According to an embodiment, the amplification circuit 711 may amplify the error between the overdrive voltage Vov input into the first input terminal (the '+' input terminal) and the system voltage Vsys input into the second input terminal (the '–' input terminal). The amplification circuit 711 may detect the variation of the value associated with the system voltage Vsys at the second input terminal (the '–' input terminal). The amplification circuit 711 may change the impedance of the blocking device 524 by outputting the voltage toward the gate terminal of the blocking device 524 from the output terminal of the amplification circuit 711, to correspond to the value associated with the system voltage Vsys. The amplification circuit 711 may set the overdrive voltage Vov to correspond to the variation of the value associated with the system voltage Vsys.

According to an embodiment, the voltage comparison units (the first voltage adder 713, the limiting amplifier 715, and the second voltage adder 717) may determine whether the system voltage Vsys is equal to or greater than the threshold voltage VTH. When the system voltage Vsys is greater than or equal to the threshold voltage VTH, the voltage comparison units (the first voltage adder 713, the limiting amplifier 715, or the second voltage adder 717) may input values, which are associated with the system voltage Vsys, to the second input terminal (the '–' input terminal) of the amplification circuit 711 to notify that the system voltage Vsys is equal to or greater than the threshold voltage VTH. The first voltage adder 713, the limiting amplifier 715, and the second voltage adder 717 may be collectively called as 'voltage comparison units'.

According to an embodiment, the first voltage adder 713 may subtract the threshold voltage VTH from the system voltage Vsys.

According to an embodiment, the limiting amplifier 715 may output a positive value of the output values from the first voltage adder 713. The limiting amplifier 715 may not output a negative value of the output value from the first voltage adder 713. The limiting amplifier 715 may be a linear regulator. The limiting amplifier 715 may linearly output a positive value of the output values from the first voltage adder 713. The limiting amplifier 715 may output 'zero', when the output value from the first voltage adder 713 is the negative value. The limiting amplifier 715 may output the output value from the first voltage adder 713, when the output value from the first voltage adder 713 is the positive value.

According to an embodiment, the second voltage adder 717 may add a reference voltage Vo_REF to the output value of the limiting amplifier 715. A second input terminal (the '–' input terminal) of the amplification circuit 711 may receive the output value from the second voltage adder 717.

According to an embodiment, when the system voltage Vsys is smaller than the threshold voltage VTH, the output value from the first voltage adder 713 is the negative value. Accordingly, the limiting amplifier 715 may output 'zero', and the output value from the second voltage adder 717 may be the reference voltage Vo_REF. When the system voltage Vsys is greater than the threshold voltage VTH, the output value from the first voltage adder 713 is the positive value. Accordingly, the limiting amplifier 715 may output the output value from the first voltage adder 713, and the output value from the second voltage adder 717 may be a value obtained by adding the output value from the first voltage adder 713 to the reference voltage Vo_REF.

According to an embodiment, when the reference voltage Vo_REF is input to the second input terminal (the '–' input terminal) of the amplification circuit 711, the amplification circuit 711 may not output the output voltage from the output terminal thereof. When a voltage value greater than the reference voltage Vo_REF is input to the second input terminal (the '–' input terminal) of the amplification circuit 711, the amplification circuit 711 may output the output voltage from the output terminal thereof.

According to an embodiment, the switching device 719 may be connected to the output terminal of the amplification circuit 711 and the blocking device 524. The switching device 719 may be set to control the blocking device 524, based on the voltage of the output terminal and an over current protection (OCP) signal.

According to an embodiment, the output capacitor 721 may be connected to one point between the inductor 523 and the blocking device 524. For example, the output capacitor 721 may be connected to a point having a voltage the same as that of the second node 752. The output capacitor 721 may be connected to one point to which the first input terminal (the '+' input terminal) of the amplification circuit 711 is connected. The one point, to which the first input terminal ("the '+' input terminal) of the amplification circuit 711 is connected, may be positioned between the second switching device 522 and the blocking device 524. The output capacitor 721 may branch from the one point to which the first input terminal (the '+' input terminal) of the amplification circuit 711 is connected. The output capacitor 721 may branch between the second switching device 522 and the blocking device 524. The output capacitor 721 may stably control the overdrive voltage Vov.

According to an embodiment, the blocking device 524 may be fully turned on in response to that the system voltage Vsys of the boost circuit 710 is less than the threshold voltage VTH. The blocking device 524 may be controlled to be in an intermediate state between the fully turned-on state and the fully turned-off state, in response to that the system voltage Vsys approaches the threshold voltage VTH, or is greater than the threshold voltage VTH.

According to an embodiment, the blocking device 524 may be set to operate as a low drop out (LDO) circuit.

According to an embodiment, the blocking device 524 may set the overdrive voltage Vov such that the inductor opposite terminal voltage is maintained as the reverse voltage.

According to an embodiment, the blocking device 524 may increase the overdrive voltage Vov such that the reverse voltage is applied to the inductor 523 for a duration (e.g., the second duration (1-D)Ts) in which the second switching device 522 is turned off, in response to that the system voltage Vsys is greater than the threshold voltage VTH According to an embodiment, the voltage comparison circuit 760 may receive the boost output voltage Vo and the reference voltage Vo_REF. The voltage comparison circuit 760 may transmit a notification signal to the PWM circuit 770, in response to that the difference is made between the boost output voltage Vo and the reference voltage Vo_REF.

According to an embodiment, the PWM circuit 770 may control an opening/closing operation of the first switching device 521 and the second switching device 522, based on the duty cycle Ts and the duty ratio 'D'. The PWM circuit 770 may receive the notification signal associated with the difference between the boost output voltage Vo received from the voltage comparison circuit 760 and the reference voltage Vo_REF. The PWM circuit 770 may control the duty ratio 'D' based on the received notification signal. The PWM circuit 770 may control the duty ratio 'D' such that the boost output voltage Vo is equal to the reference voltage Vo_REF.

Figure 8:
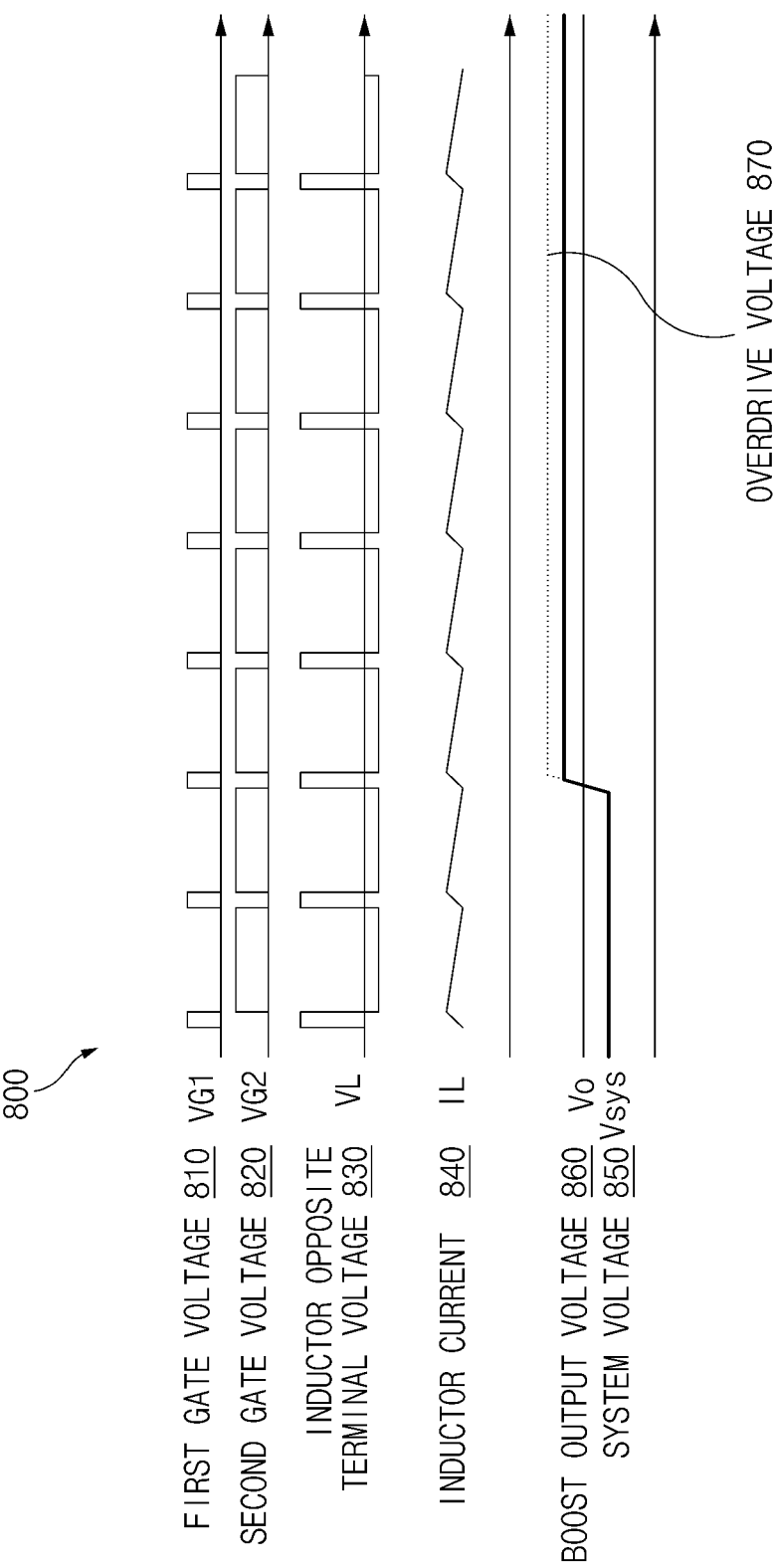
FIG. 8 illustrates a voltage and a current of an electronic device including a boost circuit, according to an embodiment.

FIG. 8 is a waveform 800 illustrating a voltage and a current of an electronic device (e.g., the electronic device 101 of FIG. 1) including a boost circuit (e.g., the boost circuit 710 of FIG. 7) according to an embodiment.

According to an embodiment, the first switching device (e.g., the first switching device 521 of FIG. 7) may be turned on or off by a first gate voltage 810. For the first duration (e.g., the first duration DTs of FIG. 4) in which the first gate voltage 810 is in a high state 'H', the first switching device 521 is turned on to control a system voltage Vsys 850 to an inductor opposite terminal voltage VL 830 and may increase an inductor current IL 840. For the second duration (e.g., the second duration (1-D)Ts of FIG. 4) in which the first gate voltage 810 is in a low state 'L', the first switching device 521 is turned off to control the inductor opposite terminal voltage VL 830 to a value Vsys-Vov, which is obtained by subtracting the overdrive voltage Vov 870 from the system voltage Vsys 850 and may increase the inductor current IL 840.

According to an embodiment, the second switching device (e.g., the second switching device 522 of FIG. 7) may be turned on or off by a second gate voltage 820. For the second duration (e.g., the second duration (1-D)Ts of FIG. 4) in which the second gate voltage 820 is in a high state 'H', the second switching device 522 is turned off to control the inductor opposite terminal voltage VL 830 to the value (Vsys-Vo), which is obtained by subtracting the overdrive voltage Vov 870 from the system voltage Vsys 850 and may decrease the inductor current IL 840.

According to a comparative example, even if the system voltage Vsys 850 is increased, the inductor opposite terminal voltage VL 630 may have a reverse voltage value having a specific size for the second duration (1-D)Ts. Even if the system voltage Vsys 850 is increased, the second switching device 522 may be turned on for the second duration (1-D)Ts. Even if the system voltage Vsys 850 is increased, the inductor current IL 840 may have a value in a specific range. Even if the system voltage Vsys 850 is increased, the boost output voltage Vo may be constantly maintained.

Figure 9:
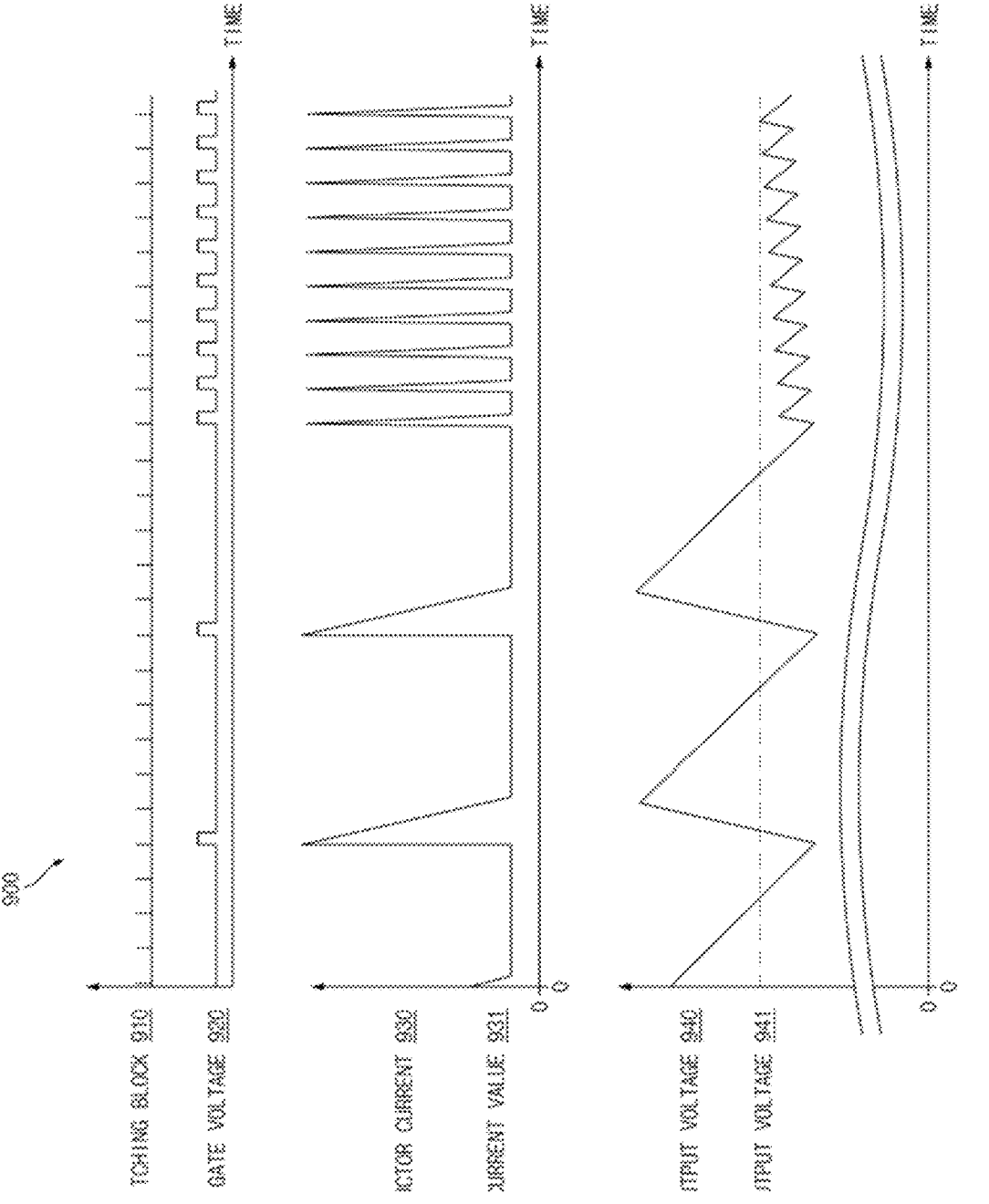
FIG. 9 illustrates a voltage of an electronic device including a boost circuit in detail, according to an embodiment.

According to an embodiment, the overdrive voltage (e.g., the overdrive voltage Vov 870 of FIG. 7), which is a voltage at one point, may be increased in response to the system voltage Vsys 850 increasing. The boost output voltage Vo may be constantly maintained, in response to the overdrive voltage Vov 870 increasing FIG. 9 is a waveform 900 illustrating a voltage of an electronic device (e.g., the electronic device 101 of FIG. 1) including a boost circuit (e.g., the boost circuit 710 of FIG. 7) according to an embodiment.

According to an embodiment, a switching clock 910 may be to define a first gate voltage 920. The first gate voltage 920 may be to define a first duration (e.g., the first duration DTs of FIG. 4) and a second duration (e.g., the second duration (1-D)Ts of FIG. 4). When an inductor current is varied, a boost output voltage 940 may be gradually decreased in magnitude to have a magnitude in a specific range after being increased at a time point at which an inductor current 930 is increased.

According to an embodiment, the inductor current 930 may have a first current value 931 for the duration in which the first gate voltage 920 is turned off. For example, the first current value 931 may have the value of about 20 mA.

According to an embodiment, when the boost output voltage 940 is controlled by using the blocking device 524 of the boost circuit 710, even if the system voltage (e.g., the system voltage Vsys of FIG. 7) is variously changed, the overdrive voltage (e.g., the overdrive voltage Vov of FIG. 7 and/or the overdrive voltage Vov 870 of FIG. 8) corresponding to the voltage may be generated. For example, while the boost output voltage 940 is about 4.6 V, the system voltage Vsys (e.g., the system voltage Vsys 850 of FIG. 8) may be changed to about 4.8 V. Even if the system voltage Vsys is greater than the boost output voltage 940, when the overdrive voltage Vov is generated to the magnitude of about 5.8 V, the inductor opposite terminal voltage (e.g., the inductor opposite terminal voltage VL of FIG. 8) may be maintained to a reverse voltage. Accordingly, while the battery 189 is charged, even if the system voltage Vsys is variously changed, the boost circuit 710 may be stably controlled.

According to an embodiment, when the boost output voltage 940 is controlled without adding the load circuit at the output stage of the boost circuit 710, a voltage is adjusted by the voltage difference value (Vov-Vo) between the overdrive voltage Vov and the boost output voltage Vo as the overdrive voltage Vov is generated in the blocking device (e.g., the blocking device 524 of FIG. 7). Accordingly, power loss may be caused by a value obtained by multiplying the voltage difference value (Vov-Vo) between the overdrive voltage Vov and the boost output voltage Vo by the current flowing through the blocking device 524. The voltage difference value (Vov-Vo) between the overdrive voltage Vov and the output voltage Vo may be smaller than the boost output voltage Vo. Accordingly, the power loss may be reduced when compared to the load circuit at the output stage of the boost circuit 710.

According to one or more embodiments, an electronic device (e.g., the electronic device 101 of FIG. 1) may include a display (e.g., the display 160 of FIG. 1) to display a screen, a battery (e.g., the battery 189 of FIG. 7), and a boost circuit (e.g., the boost circuit 710 of FIG. 7) to receive power from the battery 189 and to supply a driving voltage ELVDD to the display. The boost circuit 710 includes a first switching device (e.g., the first switching device 521 of FIG. 7) connected to a first node (e.g., the first node 751 of FIG. 7), a second switching device (e.g., the second switching device 522 of FIG. 7) connected to the first node 751, an inductor (e.g., the inductor 523 of FIG. 7) interposed between an input terminal (e.g., the input node 740 of FIG. 7) of the boost circuit 710 and the first node 751, an output capacitor (e.g., the output capacitor 721 of FIG. 7) to generate a direct current (DC) overdrive voltage by smoothing an AC current generated by the first switching device 521 and the second switching device 522, a blocking device (e.g., the blocking device 524 of FIG. 7) to block a leakage current of the battery, and a control circuit (e.g., the control circuit 730 of FIG. 7) to control the overdrive voltage Vov by controlling the blocking device, in response to that (or based on) a system voltage Vsys serving as an input voltage of the boost circuit 710 is equal to or greater than a threshold voltage VTH.

According to an embodiment, the control circuit 730 may control the overdrive voltage Vov to be maintained to at least the system voltage Vsys by variously changing the impedance of the blocking device 524 in response to that the system voltage Vsys is equal to or greater than the threshold voltage VTH.

According to an embodiment, the control circuit 730 may include an amplification circuit 711 connected to a gate terminal of the blocking device 524 to amplify an error between a value associated with the system voltage Vsys and the overdrive voltage Vov.

According to an embodiment, the amplification circuit 711 may include a first input terminal (e.g., a '+' input terminal of FIG. 7) connected to a node at which the output capacitor 721 is connected, a second input terminal (e.g., a '−' input terminal of FIG. 7) to receive a value associated with the system voltage Vsys, and an output terminal connected to the gate terminal.

According to an embodiment, the control circuit 730 may include a voltage comparison unit (e.g., the first voltage adder 713, the limiting amplifier 715, or the second voltage adder 717 of FIG. 7) to determine whether the system voltage Vsys is equal to or greater than the threshold voltage VTH.

According to an embodiment, the voltage comparison unit (the first voltage adder 713, the limiting amplifier 715, or the second voltage adder 717) may include a first voltage adder (e.g., the first voltage adder 713 of FIG. 7) to subtract the threshold voltage VTH from the system voltage Vsys, a limiting amplifier (e.g., the limiting amplifier 715 of FIG. 7) to output a positive value of output values from the first voltage adder 713, and a second voltage adder (e.g., the second voltage adder 717 of FIG. 7) to add a reference voltage Vo_REF to the output value of the limiting amplifier 715.

According to an embodiment, the control circuit 730 may further include a switching device (e.g., the switching device 719 of FIG. 7) connected to the output terminal and the control terminal of the blocking device 524, and the switching device 719 is set to control the blocking device 524, based on the voltage of the output terminal and an over current protection (OCP) signal.

According to an embodiment, the first switching device 521 may be turned on for a first duration DTs in a duty cycle (Ts), the second switching device 522 is turned on for a second duration (1-D)Ts in the duty cycle Ts except for the first duration DTs, and the magnitude of the boost output voltage Vo which is the output voltage of the boost circuit 710 is controlled to be equal to the reference voltage Vo_Ref, depending on the duty ratio 'D' of the duty cycle 'Ts'.

According to an embodiment, the blocking device 524 may be configured to be fully turned on when the system voltage Vsys is equal to or less than the threshold voltage VTH, and when the driving voltage ELVDD is supplied to the display 160, and turned off to block a leakage current from the battery 189 when the display 160 is turned off, According to an embodiment, the control circuit 730 may be configured to increase the impedance of the blocking device 524 in response to that the system voltage Vsys is equal to or greater than the threshold voltage VTH.

According to an embodiment, a method for controlling an electronic device 101 may include receiving, by a boost circuit 710 of the electronic device 101, power from a battery 189 of the electronic device 101 and supplying a driving voltage ELVDD to a display of the electronic device 101, and controlling, by a control circuit 730 of the boost circuit 710, an overdrive voltage Vov of the electronic device 101. The supplying of the driving voltage ELVDD may include generating, by a first switching device 521 and a second switching device 522 of the boost circuit 710, an AC current, and generating, by the output capacitor 721, a DC overdrive voltage Vov by smoothing the AC current. The controlling of the overdrive voltage Vov may include controlling the overdrive voltage Vov by controlling a blocking device 524 to block a leakage current, in response to that (or based on) a system voltage Vsys serving as an input voltage of the boost circuit 710 is equal to or greater than a threshold voltage VTH.

According to an embodiment, the controlling of the overdrive voltage Vov includes controlling to maintain the overdrive voltage Vov to at least the system voltage Vsys by variously changing the impedance of the blocking device 524 in response to that the system voltage Vsys is equal to or greater than the threshold voltage VTH.

According to an embodiment, the controlling of the overdrive voltage Vov may include amplifying an error between a value associated with the system voltage Vsys and the overdrive voltage Vov by using the amplification circuit 711 connected to the gate terminal of the blocking device 524.

According to an embodiment, the amplifying of the error may include sensing a variation of a value associated with the system voltage Vsys at a second input terminal (a '−' input terminal) of the amplification circuit 711, changing an impedance of the blocking device 524 by outputting a voltage to the gate terminal from the output terminal of the amplification circuit 711 to correspond to the variation of the value associated with the system voltage Vsys, and setting a target value to be controlled to correspond to the variation of the value associated with the system voltage Vsys.

According to an embodiment, the controlling of the overdrive voltage Vov may include determining whether the system voltage Vsys is equal to or greater than the threshold voltage VTH by using the voltage comparison unit (the first voltage adder 713, the limiting amplifier 715, or the second voltage adder 717).

According to an embodiment, the determining of whether the system voltage Vsys is equal to or greater than the threshold voltage VTH may include subtracting the threshold voltage from the system voltage by using a first voltage adder of the voltage comparison unit, outputting a positive value of output values from the first voltage adder by using a limiting amplifier of the voltage comparison unit, and adding a reference voltage to an output value of the limiting amplifier by using the second voltage adder of the voltage comparison unit (the first voltage adder 713, the limiting amplifier 715, or the second voltage adder 717).

According to an embodiment, the amplifying of the error may include controlling the blocking device 524, based on a voltage of the output terminal and an over current protection (OCP) signal, by using a switching device 719 connected to the output terminal and the gate terminal.

According to an embodiment, the first switching device 521 may be turned on for a first duration DTs in a duty cycle (Ts), the second switching device 522 is turned on for a second duration (1-D)Ts in the duty cycle Ts except for the first duration DTs, and the magnitude of the boost output voltage Vo which is the output voltage of the boost circuit 710 is controlled to be equal to the reference voltage Vo_Ref, depending on the duty ratio 'D' of the duty cycle 'Ts'.

According to an embodiment, the blocking device 524 may be configured to be fully turned on when the system voltage Vsys is equal to or less than the threshold voltage VTH, and when the driving voltage ELVDD is supplied to the display 160, and turned off to block a leakage current from the battery 189 when the display 160 is turned off, According to an embodiment, the control circuit 730 may be configured to increase the impedance of the blocking device 524 in response to that the system voltage Vsys is equal to or greater than the threshold voltage VTH.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities and some of multiple entities may be separately disposed on the other components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a battery; and
a boost circuit configured to receive power from the battery and to supply a driving voltage to the display, wherein the boost circuit comprises:
    a first switching device connected to a first node;
    a second switching device connected to the first node;
    an inductor between an input terminal of the boost circuit and the first node;
    an output capacitor configured to generate a direct current (DC) overdrive voltage by smoothing an alternating current (AC) current generated by the first switching device and the second switching device;
    a blocking device configured to block a leakage current of the battery; and
    a control circuit configured to control the DC overdrive voltage by controlling the blocking device, based on a system voltage that is equal to or greater than a threshold voltage, and
wherein the system voltage is an input voltage of the boost circuit, and
wherein the output capacitor is directly connected to the second switching device and is directly connected to the blocking device.

2. The electronic device of claim 1, wherein the control circuit is further configured to control the DC overdrive voltage to be maintained to the system voltage or more by changing an impedance of the blocking device based on the system voltage that is equal to or greater than the threshold voltage.

3. The electronic device of claim 1, wherein the control circuit comprises an amplification circuit connected to a gate terminal of the blocking device, and
wherein the amplification circuit is configured to amplify an error between a value associated with the system voltage and the DC overdrive voltage.

4. The electronic device of claim 3, wherein the amplification circuit comprises:
    a first input terminal connected to a node at which the output capacitor is connected;
    a second input terminal configured to receive the value associated with the system voltage; and
    an output terminal connected to the gate terminal.

5. The electronic device of claim 1, wherein the control circuit comprises a voltage comparison unit configured to determine whether the system voltage is equal to or greater than the threshold voltage.

6. The electronic device of claim 5, wherein the voltage comparison unit comprises:
    a first voltage adder configured to subtract the threshold voltage from the system voltage;
    a limiting amplifier configured to output a positive value of output values from the first voltage adder; and
    a second voltage adder configured to add a reference voltage to an output value from the limiting amplifier.

7. The electronic device of claim 4, wherein the control circuit further comprises a switching device connected to the output terminal and a control terminal of the blocking device, and wherein the switching device is configured to control the blocking device, based on a voltage of the output terminal and an over current protection (OCP) signal.

8. The electronic device of claim 1, wherein the first switching device is configured to be turned on for a first duration in a duty cycle, wherein the second switching device is configured to be turned on for a second duration in the duty cycle except for the first duration, wherein a magnitude of a boost output voltage is controlled to be equal to a reference voltage, based on a duty ratio of the duty cycle, and wherein the magnitude of the boost output voltage is an output voltage of the boost circuit.

9. The electronic device of claim 1, wherein the blocking device is further configured to:

be turned on based on the system voltage that is equal to or less than the threshold voltage and based on the driving voltage that is supplied to the display, and be turned off to block the leakage current from the battery based on the display that is turned off.

10. The electronic device of claim 1, wherein the control circuit is further configured to increase an impedance of the blocking device based on the system voltage that is equal to or greater than the threshold voltage.

11. A method for controlling an electronic device, the method comprising:

receiving, by a boost circuit of the electronic device, power from a battery of the electronic device and supplying a driving voltage to a display of the electronic device; and controlling, by a control circuit of the boost circuit, an overdrive voltage of the electronic device, wherein the supplying of the driving voltage comprises:

generating, by a first switching device and a second switching device of the boost circuit, an alternating current (AC) current; and generating, by an output capacitor, a direct current (DC) overdrive voltage by smoothing the AC current, wherein the controlling of the overdrive voltage comprises controlling the overdrive voltage by controlling a blocking device to block a leakage current, based on a system voltage that is equal to or greater than a threshold voltage, and wherein the system voltage is an input voltage of the boost circuit, wherein the output capacitor is directly connected to the second switching device and is directly connected to the blocking device.

12. The method of claim 11, wherein, the controlling of the overdrive voltage comprises controlling to maintain the overdrive voltage to at least the system voltage by changing an impedance of the blocking device based on the system voltage that is equal to or greater than the threshold voltage.

13. The method of claim 11, wherein the controlling of the overdrive voltage comprises amplifying an error between a value associated with the system voltage and the overdrive voltage by using an amplification circuit connected to a gate terminal of the blocking device.

14. The method of claim 13, wherein the amplifying of the error comprises:

sensing a variation of the value associated with the system voltage at a second input terminal of the amplification circuit;

changing an impedance of the blocking device by outputting a voltage to the gate terminal from an output terminal of the amplification circuit to correspond to the variation of the value associated with the system voltage; and setting a target value to be controlled to correspond to the variation of the value associated with the system voltage.

15. The method of claim 11, wherein the controlling of the overdrive voltage comprises determining whether the system voltage is equal to or greater than the threshold voltage by using a voltage comparison unit.

16. The method of claim 15, wherein the determining of whether the system voltage is equal to or greater than the threshold voltage comprises:

subtracting the threshold voltage from the system voltage by using a first voltage adder of the voltage comparison unit;

outputting a positive value of output values from the first voltage adder by using a limiting amplifier of the voltage comparison unit; and adding a reference voltage to an output value from the limiting amplifier by using a second voltage adder of the voltage comparison unit.

17. The method of claim 14, wherein the amplifying of the error comprises:

controlling the blocking device, based on a voltage of the output terminal and an over current protection signal, by using a switching device connected to the output terminal and the gate terminal.

18. The method of claim 11, wherein the first switching device is turned on for a first duration in a duty cycle, wherein the second switching device is configured to be turned on for a second duration in the duty cycle except for the first duration, and wherein a magnitude of a boost output voltage, which is an output voltage of the boost circuit, is controlled to be equal to a reference voltage, based on a duty ratio of the duty cycle.

19. The method of claim 11, wherein the blocking device is configured to:

be turned on based on the system voltage that is equal to or less than the threshold voltage, and based on the driving voltage that is supplied to the display; and be turned off to block the leakage current from the battery based on the display is turned off.

20. The method of claim 11, wherein the control circuit is further configured to increase an impedance of the blocking device based on the system voltage that is equal to or greater than the threshold voltage.

* * * * *